US006870969B2

(12) United States Patent
Liu

(10) Patent No.: US 6,870,969 B2
(45) Date of Patent: Mar. 22, 2005

(54) METHOD AND APPARATUS FOR PHASE SHIFTING AND OPTICAL BEAM IN AN OPTICAL DEVICE WITH REDUCED CONTACT LOSS

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 10/422,142

(22) Filed: Apr. 23, 2003

(65) Prior Publication Data

US 2004/0213497 A1 Oct. 28, 2004

(51) Int. Cl.[7] .................. G02F 1/035; G02F 1/295; G02B 6/02; G02B 6/10; H01S 5/00
(52) U.S. Cl. ................. 385/3; 372/45; 385/14; 385/129; 385/131; 257/79
(58) Field of Search .................. 385/1–4, 14, 37, 385/129, 131–132; 372/43–48, 96; 257/49–52, 79, 458, 163; 438/22, 29

(56) References Cited

U.S. PATENT DOCUMENTS

| 5,434,700 A | * | 7/1995 | Yoo ..................... 359/332 |
| 5,610,095 A | * | 3/1997 | Zirngibl ................ 438/23 |
| 5,684,819 A | * | 11/1997 | Zirngibl ............... 372/50 |
| 5,726,462 A | * | 3/1998 | Spahn et al. ........... 257/76 |
| 5,978,402 A | * | 11/1999 | Matsumoto et al. ..... 372/50 |
| 6,008,926 A | | 12/1999 | Moodie et al. |
| 6,198,853 B1 | * | 3/2001 | Yamada .................. 385/2 |
| 6,298,177 B1 | | 10/2001 | House |
| 6,377,596 B1 | * | 4/2002 | Tanaka et al. ......... 372/45 |
| 6,459,712 B2 | * | 10/2002 | Tanaka et al. ......... 372/45 |
| 6,778,751 B2 | * | 8/2004 | Tada et al. ........... 385/131 |
| 2001/0038655 A1 | * | 11/2001 | Tanaka et al. ......... 372/43 |
| 2002/0054724 A1 | * | 5/2002 | Tada et al. ............. 385/2 |
| 2002/0093717 A1 | | 7/2002 | Paniccia et al. |
| 2003/0085736 A1 | * | 5/2003 | Kish et al. ............. 385/14 |
| 2003/0128729 A1 | * | 7/2003 | Matsumura ............. 372/46 |
| 2003/0138179 A1 | * | 7/2003 | Akiyama et al. ........ 385/2 |

FOREIGN PATENT DOCUMENTS

| EP | 1256825 A2 | 11/2002 |
| WO | WO 02/069004 A2 | 9/2002 |
| WO | PCT/US2004/007825 | 8/2004 |

OTHER PUBLICATIONS

Tang, C. K., et al., "Highly Efficient Optical Phase Modulator in SOI Waveguide", *Electronics Letters*, vol. 31, No. 6, Mar. 16, 1995, pp. 451–452.

Zhao, C. Z., et al., "Silicon–On–Insulator Optical Intensity Modulator Based On Waveguide–Vanishing Effect", *Electronics Letters*, vol. 32, No. 18, Aug. 29, 1996, pp. 1667–1668.

(List continued on next page.)

*Primary Examiner*—Akm Enayet Ullah
(74) *Attorney, Agent, or Firm*—Blakely, Sokoloff, Taylor & Zafman LLP

(57) ABSTRACT

An apparatus and method for modulating a phase of optical beam with reduced contact loss. In one embodiment, an apparatus according to embodiments of the present invention includes a first region of an optical waveguide disposed in semiconductor material. The first region has a first conductivity type. The apparatus also includes a second region of the optical waveguide disposed in the semiconductor material. The second region has a second conductivity type, which is opposite to the first conductivity type. The apparatus also includes an insulating region disposed between the first and second regions of the optical waveguide. A first contact is coupled to the optical waveguide at a first location outside an optical path of an optical beam, which is to be directed through the optical waveguide. A first buffer of insulating material is disposed along the optical waveguide between the first contact and the optical path of the optical beam.

30 Claims, 7 Drawing Sheets

OTHER PUBLICATIONS

Cutolo, A., et al., "Silicon Electro–Optic Modulator Based On A Three Terminal Device Integrated In A Low–Loss Single–Mode SOI Waveguide", *Journal of Lightwave Technology,* vol. 15, No. 3, Mar. 1997, pp. 505–518.

Dainesi, P., et al., "CMOS Compatible Fully Integrated Mach–Zehnder Interferometer in SOI Technology", *IEEE Photonics Technology Letters,* vol. 12, No. 6, Jun. 2000, pp. 660–662.

* cited by examiner

METHOD AND APPARATUS FOR PHASE SHIFTING AND OPTICAL BEAM IN AN OPTICAL DEVICE WITH REDUCED CONTACT LOSS

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for phase shifting an optical beam with an optical device with reduced contact loss are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having a complementary metal oxide semiconductor (CMOS) capacitor structure adapted to phase shift an optical beam in response to a signal. In one embodiment, the CMOS capacitor structure is adapted to modulate a charge modulated region in the waveguide. An optical beam is to be directed through the waveguide and through the charge modulated region to phase shift the optical beam. In one embodiment, optical loss due to any overlap between the optical mode and a metal contact is reduced with a buffer of insulating material disposed between the optical path of the optical beam and the metal contact. Embodiments of the disclosed optical devices can be used in a variety of high bandwidth applications including multi-processor, telecommunications, networking as well as other high speed optical applications such as optical delay lines, switches, modulators, add/drops, or the like.

Figure 1:
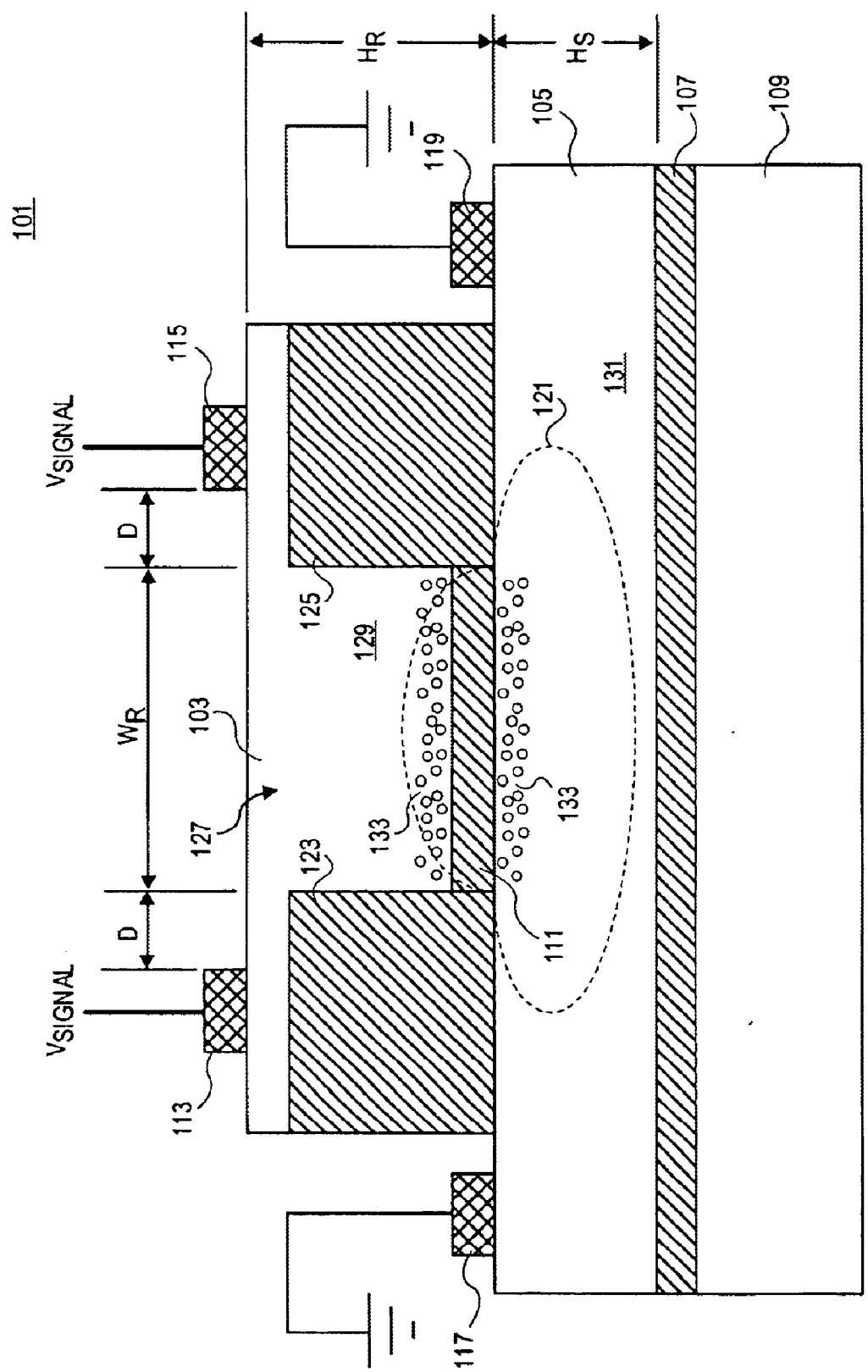
FIG. 1 is a cross-section illustration of one embodiment of an optical device including a buffer of insulating material disposed between a contact and an optical path in accordance with the teachings of the present invention.

To illustrate, FIG. 1 is a cross-section illustrating generally one embodiment of an optical device including a buffer of insulating material disposed between a contact and an optical path of an optical beam in accordance with the teachings of the present invention. As shown in FIG. 1, optical device 101 includes a first region of semiconductor material 103 having a first conductivity type and a second region of semiconductor material 105 having a second conductivity type. In one embodiment, semiconductor material 103 includes p-type dopants and semiconductor material 105 includes n-type dopants. It is appreciated that the polarities of the dopants are provided or explanation purposes and that the polarities of the dopants and corresponding voltages may be reversed in accordance with the teachings of the present invention. In one embodiment, an insulating region 111 is disposed between semiconductor material regions 103 and 105. As illustrated in FIG. 1, one embodiment of optical device 101 is fabricated on a silicon-on-insulator (SOI) wafer and therefore includes a buried insulating layer 107 and a layer of semiconductor material 109.

In one embodiment, an optical waveguide 127 is included in optical device 101, through which an optical beam 121 is directed along an optical path. In the embodiment illustrated in FIG. 1, waveguide 127 is a rib waveguide including a rib region 129 and a slab region 131. In one embodiment, optical beam 121 includes infrared or near infrared light. For example, in one embodiment, optical beam 121 has a wavelength near approximately 1.3 $\mu$m or 1.55 $\mu$m. In the embodiment illustrated in FIG. 1, the optical path along which optical beam 121 is directed is along an axis that parallel to the axis of the optical waveguide of optical device 101. In the example shown in FIG. 1, the optical path and therefore optical beam 121 are shown to propagate along a direction going through, or coming in and out of, the page.

As shown in the embodiment of FIG. 1, semiconductor material region 105 is grounded through contacts 117 and 119 and semiconductor material region 103 is coupled to receive $V_{SIGNAL}$ through contacts 113 and 115. In one embodiment, contacts 113, 115, 117 and 119 are metal contacts that are coupled to semiconductor regions 103 and 105 at locations outside the optical path of optical beam 121. The application of $V_{SIGNAL}$ to optical waveguide, as shown in FIG. 1, results in the modulation of free charge carriers in charge modulated region 133, which is proximate to insulating region 111 and through which optical beam 121 is directed. As can be appreciated to a person skilled in the art having the benefit of this disclosure, a CMOS capacitor type structure is therefore provided according to embodiments of the present invention where the highly charged regions on opposite sides of insulating region 111 represent the plates of the CMOS capacitor-type structure.

In one embodiment, a buffer of insulating material 123 and a buffer of insulating material 125 are also included in an optical device 101 in accordance with the teachings of the present invention. As shown in FIG. 1, buffer 123 is disposed between contact 113 and the optical path of optical beam 121. Buffer 125 is disposed between contact 115 and the optical path of optical beam 121. In one embodiment, buffers 123 and 125 are made of materials having lower refractive indexes than the refractive index of the core of waveguide 127. As a result, buffers 123 and 125 serve as cladding so as to help confine optical beam 121 to remain within waveguide 127. In the embodiment illustrated in FIG. 1, buried insulating layer 107 also serves as cladding so as to help confine optical beam 121 to remain within waveguide 127. In one embodiment, buffers 123 and 125 also serve as electrical isolators so as to electrically isolate the contacts coupled to waveguide 127 from the optical electric field guided from optical beam 121.

In operation, optical beam 121 is directed through optical waveguide 127 along an optical path through charge modulated region 133. $V_{SIGNAL}$ is applied to optical waveguide 127 to modulate the free charge carrier concentration in charge modulated region 133 at the interfaces between insulating region 111 and regions of semiconductor material 103 and 105. The applied voltage from $V_{SIGNAL}$ changes the free charge carrier density in charge modulated region 133, which results in a change in the refractive index of the semiconductor material in optical waveguide 127.

In one embodiment, the free charge carriers in charge modulated region 133 may include for example electrons, holes or a combination thereof. In one embodiment, the free charge carriers may attenuate optical beam 121 when passing through. In particular, the free charge carriers in charge modulated region 133 may attenuate optical beam 121 by converting some of the energy of optical beam 121 into free charge carrier energy. Accordingly, the absence or presence of free charge carriers in charge modulated region 133 in response to in response to $V_{SIGNAL}$ will modulate optical beam 121 in accordance with the teachings of the present invention.

In one embodiment, the phase of optical beam 121 that passes through charge modulated region 133 is modulated in response to $V_{SIGNAL}$. In one embodiment, the phase of optical beam 121 passing through free charge carriers in charge modulated region 133, or the absence of free charge carriers, in optical waveguide 127 is modulated due to the plasma optical effect. The plasma optical effect arises due to an interaction between the optical electric field vector and free charge carriers that may be present along the optical path of the optical beam 121 in optical waveguide 127. The electric field of the optical beam 121 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 127 of optical device 101 is modulated in response to the modulation of free charge carriers charge modulated region 133. The modulated index of refraction in the waveguide of optical device 101 correspondingly modulates the phase of optical beam 121 propagating through optical waveguide 127 of optical device 101. In addition, the free charge carriers in charge modulated region 133 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \quad \text{(Equation 1)}$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 2)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters.

In one embodiment, the dimensions of optical waveguide 127 are designed to accommodate a single mode for optical beam 121. For instance, in one embodiment, the width $W_R$ of the rib region 129 of optical waveguide 127 is approximately 2.5 μm, the height $H_R$ of the rib region 129 of optical waveguide 127 is approximately 0.9 μm and the height $H_S$ of the slab region 131 of optical waveguide 127 is approximately 1.5 μm. In one embodiment, the thickness of buffer regions 123 and 125 is approximately 0.5 to 0.8 μm and the thickness of the semiconductor material region 103 between contacts 113 and 115 and buffer regions 123 and 125 is approximately 0.2 to 0.3 μm. It is appreciated that these dimensions are provided for explanation purposes and that other dimensions may be utilized in accordance with the teachings of the present invention.

Figure 2:
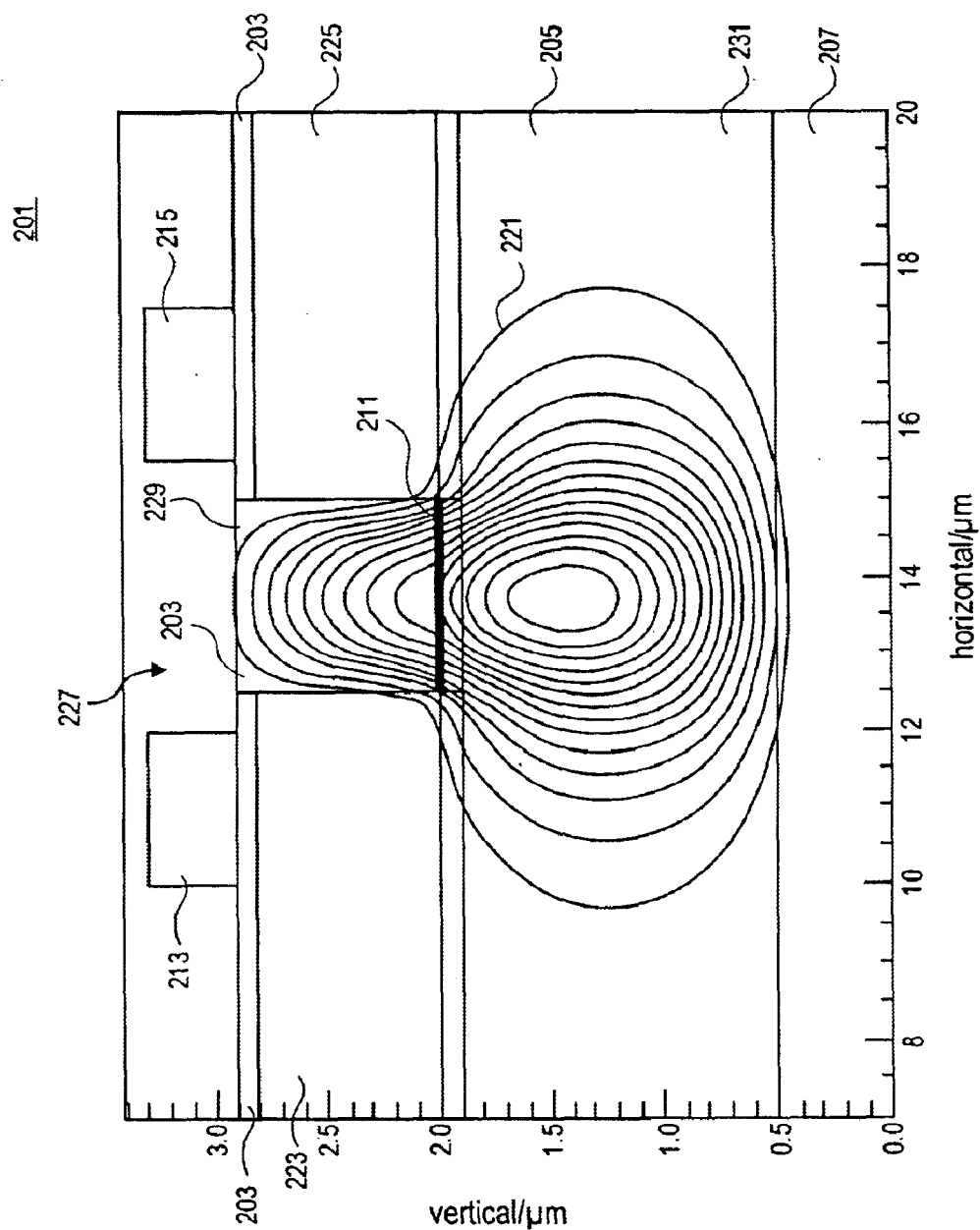
FIG. 2 is a diagram illustrating full vectorial modeling of an optical beam directed through one embodiment of an optical device including a buffer of insulating material disposed between a contact and an optical path in accordance with the teachings of the present invention.

To illustrate, FIG. 2 is a diagram illustrating full vectorial modeling of an optical beam 221 directed through one embodiment of an optical device 201 having an optical waveguide 227 including buffers of insulating material 223 and 225 disposed between contacts 213 and 215 and an optical path through which optical beam 221 is directed in accordance with the teachings of the present invention. In the embodiment illustrated in FIG. 2, optical waveguide 227 is a rib waveguide including a rib region 229 separated from a slab region 231 by an insulating layer 211. In one embodiment, rib region 229 is made of a first region of semiconductor material 203 having a first conductivity type and slab region 231 is made of a second region of semiconductor material 205 having a second conductivity type, which is opposite to the first conductivity type. The illustration shown in FIG. 2 shows the optical device 201 operating in transverse electrical field (TE) mode where the optical waveguide 227 is operating in a horizontal polarization state. In illustrated embodiment, it is appreciated that the relatively thin region of semiconductor material 203 above buffer regions 223 and 225 may be heavily doped for higher speed without optical loss since there is substantially no guided optical electric field from optical beam 227 in these portions of semiconductor material 203 because of the presence of buffer regions 223 and 225.

Figure 3:
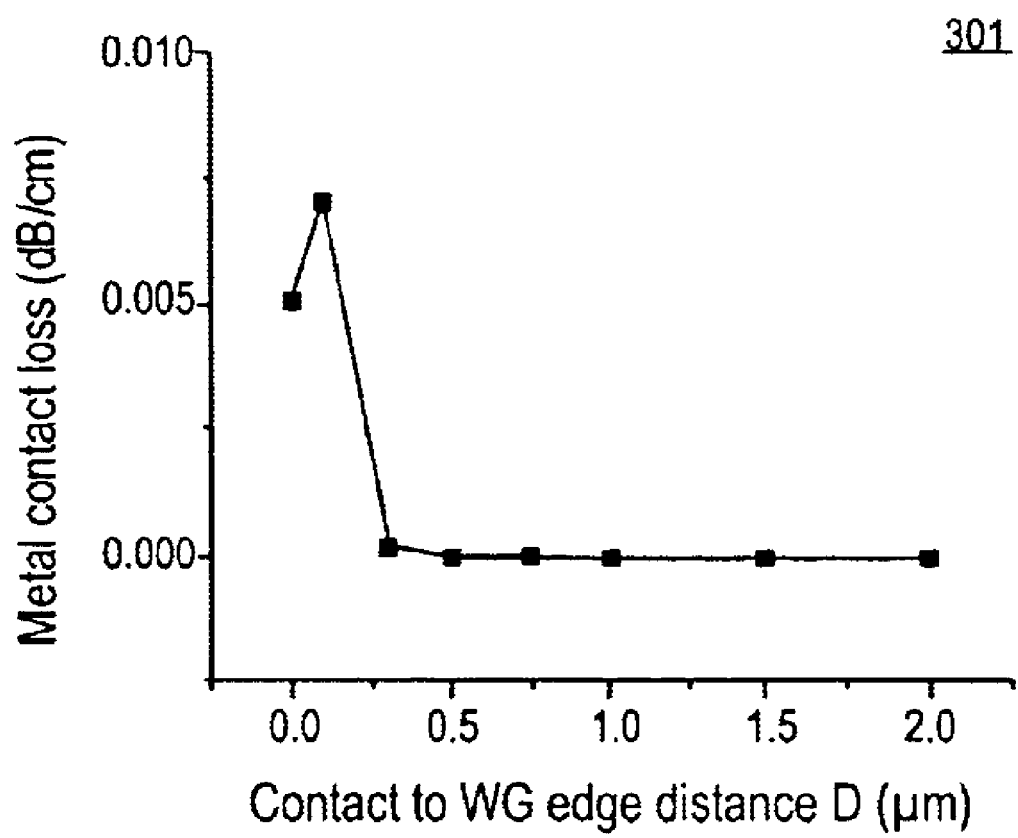
FIG. 3 is a plot illustrating a relationship between contact loss and contact to waveguide edge distance according to one embodiment of an optical device including a buffer of insulating material disposed between a contact and an optical path in accordance with the teachings of the present invention.

Referring back to the embodiment illustrated in FIG. 1, contacts 113 and 115 coupled to semiconductor material region 103 at locations offset a distance D from the edge of the rib region 129 of optical waveguide 127. In one embodiment, the amount of optical loss of optical beam 121 is related to the distance D between contacts 113 and 115 and the respective lateral edges of the rib region 129 of optical waveguide 127. To illustrate, FIG. 3 is a plot 301 illustrating the relationship between metal contact loss and contact to waveguide edge distance D according to one embodiment of an optical device including a buffer of insulating material disposed between a contact and an optical path in accordance with the teachings of the present invention. In the embodiment of FIG. 3, a silicon optical rib waveguide is illustrated having rib region width $W_R$ equal to approximately 2.5 μm, a rib region height $H_R$ equal to approximately 0.9 μm and a slab region height $H_S$ equal to approximately 1.5 μm.

As can be observed from plot 301 of FIG. 3, there is substantially no metal contact loss for distances D greater than approximately 0.25 μm in one embodiment according to the teachings of the present invention. It is noted that by reducing the distance D between contacts 113 and 115 and charge modulated region 133, the speed of optical device 201 may be increased due to the reduced resistor-capacitor (RC) time constant of the device. Therefore, it is appreciated that contacts 113 and 115 may be located very close to the center of optical waveguide 127 in accordance with the teachings of the present invention with substantially little or no optical loss due to contacts 113 and 115 while the operating speed is still high. Indeed, it is appreciated that without buffers 123 and 125, a relatively high amount of optical loss would result due to an overlap between the optical mode of optical beam 121 and contacts 113 and/or 115. With any process induced roughness, interface curvature or over etch of semiconductor material, the contact loss could be substantially higher.

Figure 4:
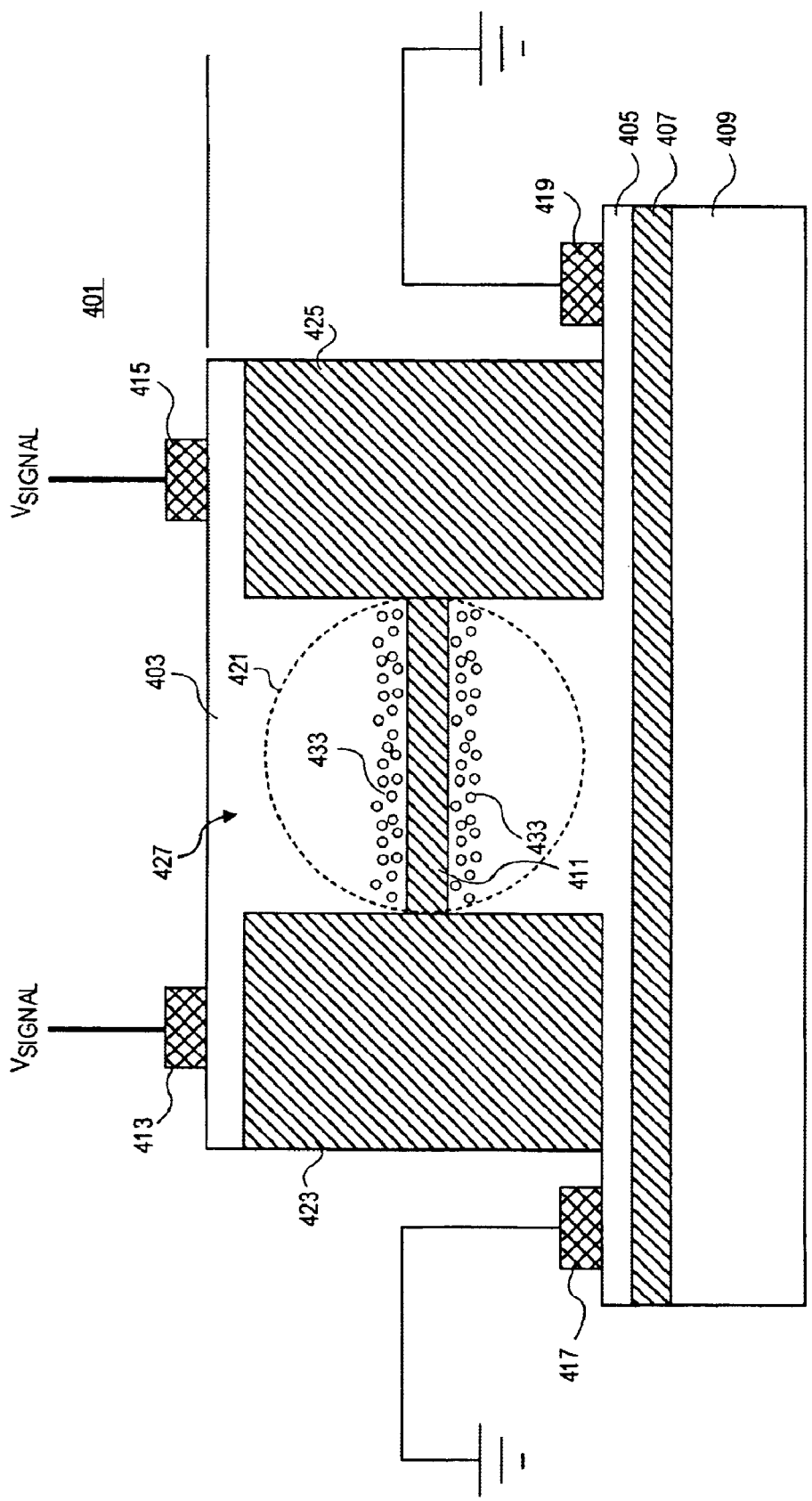
FIG. 4 is a cross-section illustration of another embodiment of an optical device including a buffer of insulating material disposed between a contact and an optical path in accordance with the teachings of the present invention.

FIG. 4 is a cross-section illustration of another embodiment of an optical device 401 including a buffer of insulating material disposed between a contact and an optical path in accordance with the teachings of the present invention. Optical device 401 shares similarities with the previously described embodiments of optical devices of FIGS. 1–3 with an exception being that optical device 401 includes a strip waveguide 427 instead of a rib waveguide. In particular, optical device 401 includes a first region of semiconductor material 403 having a first conductivity type and a second region of semiconductor material 405 having a second conductivity type. In one embodiment, semiconductor material 403 includes p-type dopants and semiconductor material 405 includes n-type dopants. In one embodiment, an insulating region 411 is disposed between semiconductor material regions 403 and 405. As illustrated in FIG. 4, one embodiment of optical device 401 is fabricated on an SOI wafer and therefore includes a buried insulating layer 407 and a layer of semiconductor material 409. In one embodiment, an optical beam 421 is directed along an optical path through optical waveguide 427. In one embodiment, optical beam 421 includes infrared or near infrared light.

As shown in the embodiment of FIG. 4, semiconductor material region 405 is grounded through contacts 417 and 419 and semiconductor material region 403 is coupled to receive $V_{SIGNAL}$ through contacts 413 and 415. In one embodiment, contacts 413, 415, 417 and 419 are metal contacts that are coupled to semiconductor regions 403 and 405 at locations outside the optical path of optical beam 421. The application of $V_{SIGNAL}$ to optical waveguide, as shown in FIG. 4, results in the modulation of free charge carriers in charge modulated region 433, which is proximate to insulating region 411 and through which optical beam 421 is directed. As can be appreciated to a person skilled in the art having the benefit of this disclosure, a CMOS capacitor type structure is therefore provided according to embodiments of the present invention where the highly charged regions on opposite sides of insulating region 411 represent the plates of the CMOS capacitor-type structure.

In one embodiment, a buffer of insulating material 423 and a buffer of insulating material 425 are also included in an optical device 401 in accordance with the teachings of the present invention. As shown in FIG. 4, buffer 423 is disposed between contacts 413 and 417 and the optical path of optical beam 421. Buffer 425 is disposed between contacts 415 and 419 and the optical path of optical beam 421. In one embodiment, buffers 423 and 425 are made of materials having lower refractive indexes than the refractive index of the core of optical waveguide 427. As a result, buffers 423 and 425 serve as cladding so as to help confine optical beam 421 to remain within optical waveguide 427. In the embodiment illustrated in FIG. 4, buried insulating layer 407 also serves as cladding so as to help confine optical beam 421 to remain within waveguide 427. In one embodiment, buffers 423 and 425 also serve as electrical isolators so as to electrically isolate the contacts coupled to waveguide 427 from the optical electric field guided from optical beam 421.

In operation, optical beam 421 is directed through optical waveguide 427 along an optical path through charge modulated region 433. $V_{SIGNAL}$ is applied to optical waveguide 427 to modulate the free charge carrier concentration in charge modulated region 433 at the interfaces between insulating region 411 and regions of semiconductor material 403 and 405. The applied voltage from $V_{SIGNAL}$ changes the free charge carrier density in charge modulated region 433, which results in a change in the refractive index of the semiconductor material in optical waveguide 427. As discussed above, the change in refractive index results in a phase shift of optical beam 421 in response to $V_{SIGNAL}$ in accordance with the teachings of the present invention.

Figure 5:
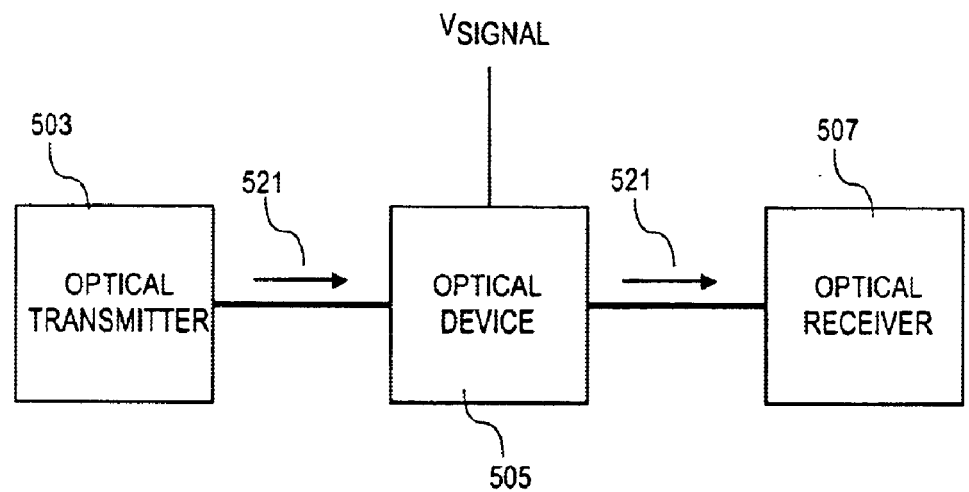
FIG. 5 is a block diagram illustration of one embodiment of a system including an optical transmitter and an optical receiver with an optical device including a one embodiment of an optical phase shifter according to embodiments of the present invention.

FIG. 5 illustrates generally a block diagram of one embodiment of a system including an optical transmitter and an optical receiver with an optical device according to embodiments of the present invention. In particular, FIG. 5 shows optical system 501 including an optical transmitter 503 and an optical receiver 507. In one embodiment, optical system 501 also includes an optical device 505 optically coupled between optical transmitter 503 and optical receiver 507. As shown in FIG. 5, optical transmitter 503 transmits an optical beam 521 that is received by optical device 505. In one embodiment, optical device 505 may include for example a device such as one of the embodiments of the optical devices described above in connection with FIGS. 1–4 to phase shift optical beam 521 in response to signal $V_{SIGNAL}$. In such an embodiment, optical device 505 may serve as an optical delay. In another embodiment, optical device 505 may be employed in an optical switch, an optical modulator or the like.

Figure 6:
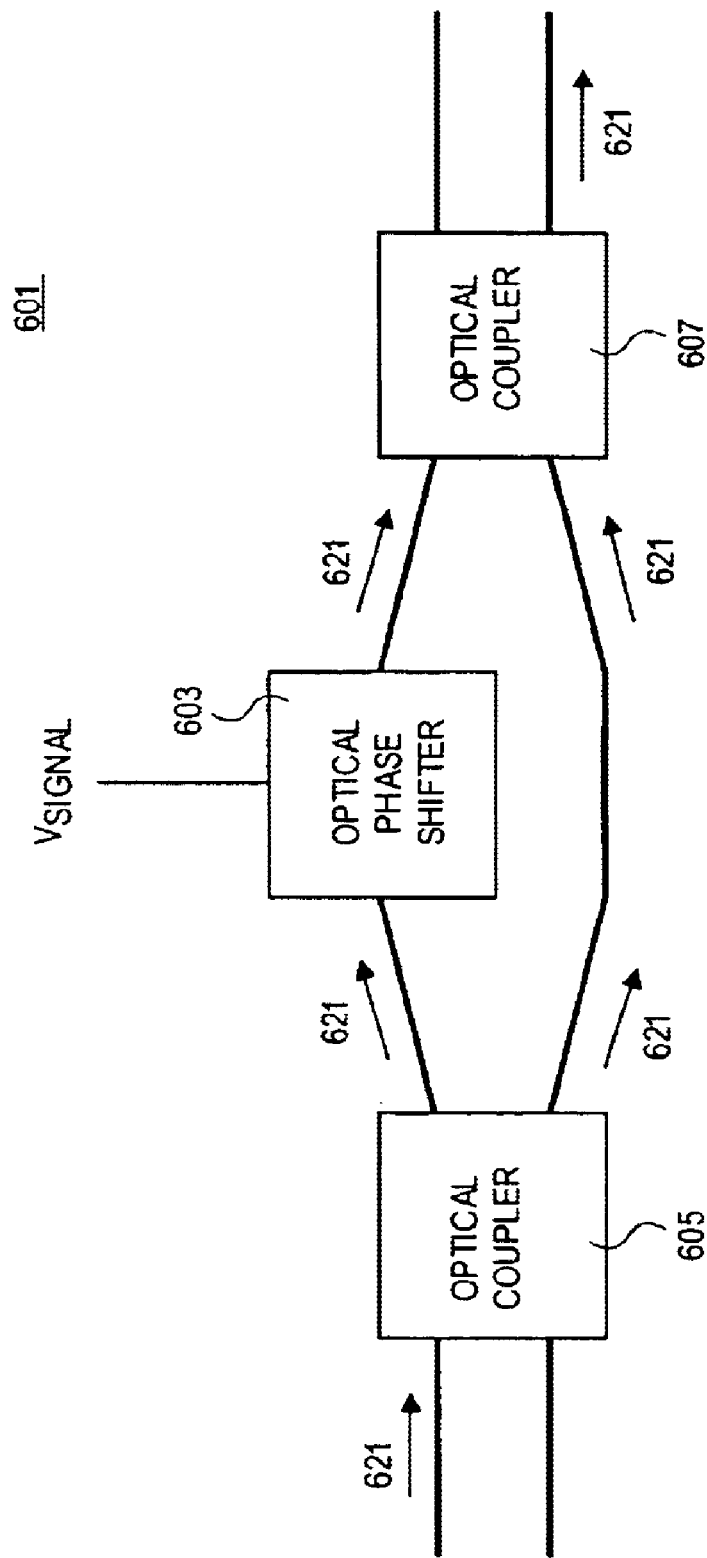
FIG. 6 is a block diagram illustration of one embodiment of an optical switch including an optical phase shifter according to embodiments of the present invention.

For example, in one embodiment of the present invention, a semiconductor-based optical switching device may be provided in a fully integrated solution on a single integrated circuit chip. In one embodiment, a 2×2 optical switch is realized with cascaded optical couplers with a phase shifter optically coupled in between. To illustrate, FIG. 6 shows generally one embodiment of an optical switch 601 that can be employed for optical device 505 of FIG. 5. As shown in the depicted embodiment, optical switch 601 includes an optical phase shifter 603 optically coupled between cascaded optical couplers 605 and 607. In one embodiment, optical phase shifter 603 is similar to one of the embodiments of optical devices described above in connection with FIGS. 1–4.

In one embodiment, optical couplers 605 and 607 may be realized with multi-mode interference devices (MMI) or other suitable optical coupling devices such as for example 3-dB evanescent waveguide couplers or the like to split an input optical beam. In one embodiment, optical couplers 605 and 607 are disposed the same semiconductor material as optical phase shifter 603. As shown, each of the optical couplers 605 and 607 has two inputs and two outputs. It is appreciated that although the terms "input" and "output" have been used herein for explanation purposes to describe optical couplers 605 and 607. Optical beams directed through the optical couplers may therefore propagate in the reverse direction or in both directions.

In one embodiment, one of the inputs of optical coupler 605 is optically coupled to receive an optical beam 621 through an input waveguide. Optical beam 621 is split and is output from each of the outputs of optical coupler 605. One of the split optical beams of optical beam 621 is directed through optical phase shifter 603 before it is directed into one of the inputs of optical coupler 607. The other one of the split optical beams of optical beam 609 is directed into the other one of the inputs of optical coupler 607.

In operation, optical phase shifter 603 is used to selectively adjust the relative phase difference between the two split beams of optical beam 621. In particular, optical phase shifter may be used to control the relative phase difference to be either substantially 0 or π in response to $V_{SIGNAL}$. As a result of the selectable phase difference between the split optical beams of optical beam 621, optical beam 621 may selectively be output from one or the other output of optical coupler 607. In the embodiment depicted in FIG. 6, optical beam 621 is illustrated to be output from the "bottom" output. Optical beam 621 may alternatively be output from the "top" output of optical coupler 607 based on the relative phase difference resulting from $V_{SIGNAL}$ in accordance with the teachings of the present invention. Accordingly, first and second optical receivers (not shown) may be optically coupled to the two outputs of optical coupler 607 and either one of the first and second optical receivers may be selected to receive optical beam 621 in response to $V_{SIGNAL}$ in accordance with the teachings of the present invention.

Figure 7:
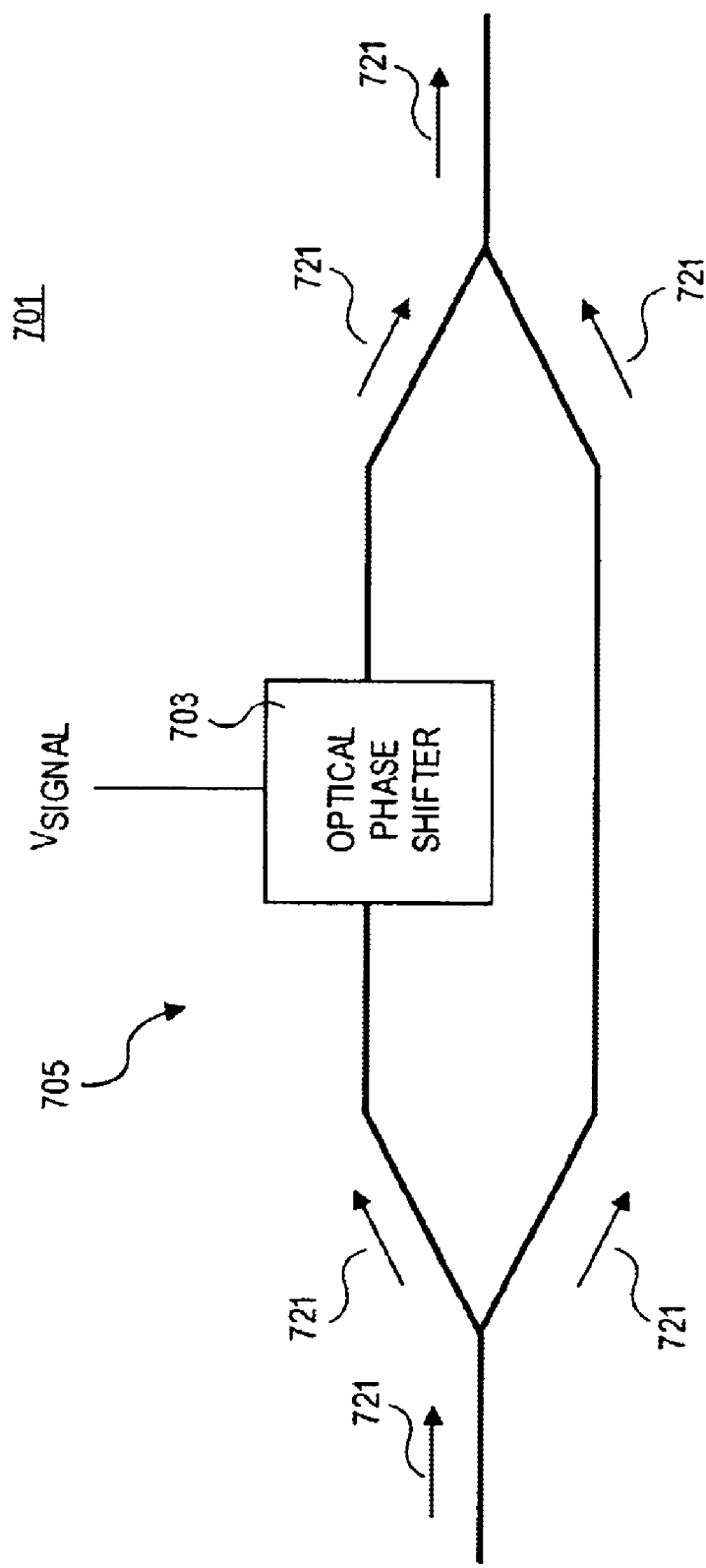
FIG. 7 is a block diagram illustration of one embodiment of an optical modulator including a Mach Zehnder Interferometer (MZI) configuration having one embodiment of an optical phase shifter according to embodiments of the present invention.

FIG. 7 illustrates generally one embodiment of an optical modulator 701 that can be employed in place optical device 505 of FIG. 5. As shown in the depicted embodiment, optical modulator 701 includes an optical phase shifter 703 in one of the two arms optically coupled between cascaded Y-branch couplers of a Mach-Zehnder Interferometer (MZI) configuration 705 disposed in semiconductor material. In one embodiment, optical phase shifter 703 is similar to one of the embodiments of the optical devices described above in connection with FIGS. 1–4.

In operation, an optical beam 721 is directed into an input of MZI configuration 705. Optical beam 721 is split such that a first portion of the optical beam 721 is directed through one of the arms of the MZI configuration 705 and a second portion of optical beam 721 is directed through the other one of the arms of the MZI configuration 705. As shown in the depicted embodiment, one of the arms of the MZI configuration 705 includes optical phase shifter 703, which adjusts a relative phase difference between the first and second portions of optical beam 721 in response to signal $V_{SIGNAL}$. In one embodiment, the first and second portions of optical beam 721 are then merged in the semiconductor substrate such that optical beam 721 is modulated at the output of MZI configuration 705 as a result of constructive or destructive interference. In one embodiment, as shown, one of the arms of the MZI configuration 705 includes an optical phase shifter 703. In another embodiment, both of the arms of the MZI configuration 705 may include an optical phase shifter 703.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a first region of an optical waveguide disposed in semiconductor material, the first region having a first conductivity type;
    a second region of the optical waveguide disposed in the semiconductor material, the second region having a second conductivity type opposite to the first conductivity type;
    an insulating region disposed between the first and second regions of the optical waveguide;
    a first contact coupled to the optical waveguide at a first location outside an optical path of an optical beam to be directed through the optical waveguide; and
    a first buffer of insulating material disposed along the optical waveguide between the first contact and the optical path of the optical beam.

2. The apparatus of claim 1 further comprising:
    a second contact coupled to the optical waveguide at a second location outside the optical path of the optical beam; and
    a second buffer of insulating material disposed along the optical waveguide between the second contact and the optical path of the optical beam.

3. The apparatus of claim 2 wherein the first and second buffers of insulating material are laterally disposed along sidewalls of the optical waveguide to serve as cladding so as to help confine the optical beam within the optical waveguide.

4. The apparatus of claim 3 wherein the first and second buffers of insulating material are adapted to serve as electrical isolators to isolate first and second contacts from the optical path of the optical beams.

5. The apparatus of claim 2 wherein the optical waveguide comprises a rib waveguide, wherein the first region comprises a rib portion of the optical waveguide.

6. The apparatus of claim 5 wherein the first and second contacts are coupled to the rib portion of the optical waveguide.

7. The apparatus of claim 1 wherein the optical waveguide comprises a rib waveguide, wherein the second region comprises a slab portion of the optical waveguide.

8. The apparatus of claim 1 wherein the optical waveguide comprises a strip waveguide.

9. The apparatus of claim 1 further comprising a third contact coupled to the second region of the optical waveguide at a third location outside the optical path of the optical waveguide.

10. The apparatus of claim 9 wherein the first buffer of insulating material is disposed between the third contact and the optical path of the optical beam.

11. The apparatus of claim 2 further comprising a fourth contact coupled to the second region of the optical waveguide at a fourth location outside the optical path of the optical waveguide.

12. The apparatus of claim 11 wherein the second buffer of insulating material is disposed between the fourth contact and the optical path of the optical beam.

13. The apparatus of claim 1 further comprising a charge modulated region to be modulated along the optical path of the optical beam and proximate to the insulating region between the first and second regions of the optical waveguide, the charge modulated region to modulate a phase of the optical beam to be directed through the optical waveguide.

14. The apparatus of claim 13 wherein the charge modulated region to be modulated in response to a signal coupled to be received by the first contact.

15. A method, comprising:
    directing an optical beam along an optical path through an optical waveguide disposed in semiconductor material;
    applying an electrical signal to a first contact coupled the optical waveguide at a first location; and
    isolating the first contact from the optical path through which the optical beam is directed with a first buffer of insulating material disposed along the optical waveguide between the first contact and the optical path of the optical beam.

16. The method of claim 15 further comprising:
    applying the electrical signal to a second contact coupled the optical waveguide at a second location; and
    isolating the second contact from the optical path through which the optical beam is directed with a second buffer of insulating material disposed along the optical waveguide between the second contact and the optical path of the optical beam.

17. The method of claim 16 further comprising confining the optical beam within the optical waveguide with the first and second buffers of insulating material serving as lateral cladding to the optical waveguide.

18. The method of claim 15 further comprising modulating in response to the electrical signal a charge modulated region through which the optical beam is directed along the optical path through the optical waveguide.

19. The method of claim 18 further comprising phase shifting in response to the charge modulated region the optical beam directed along the optical path through the optical waveguide.

20. The method of claim 15 wherein the first contact is coupled to a first region of the optical waveguide disposed in semiconductor material, the first region having a first conductivity type, the method further comprising grounding a third contact coupled to a second region of the optical waveguide disposed in the semiconductor material, the second region having a second conductivity type opposite to the first conductivity type.

21. The method of claim 20 further comprising isolating the third contact from the optical path through which the optical beam is directed with the first buffer of insulating material disposed along the optical waveguide between the third contact and the optical path of the optical beam.

22. A system, comprising:

an optical transmitter to generate an optical beam;

an optical receiver optically coupled to receive the optical beam;

an optical device optically coupled between the optical transmitter and the optical receiver, the optical device including an optical phase shifter to modulate a phase of the optical beam, the optical phase shifter including:

- a first region of an optical waveguide disposed in semiconductor material, the first region having a first conductivity type;
- a second region of the optical waveguide disposed in the semiconductor material, the first region having a second conductivity type opposite to the first conductivity type;
- an insulating region disposed between the first and second regions of the optical waveguide;
- a first contact coupled to the optical waveguide at a first location outside an optical path of an optical beam to be directed through the optical waveguide; and
- a first buffer of insulating material disposed along the optical waveguide between the first contact and the optical path of the optical beam.

23. The system of claim 22 wherein the optical phase shifter further includes:

- a second contact coupled to the optical waveguide at a second location outside the optical path of the optical beam; and
- a second buffer of insulating material disposed along the optical waveguide between the second contact and the optical path of the optical beam.

24. The system of claim 23 wherein the first and second buffers of insulating material are laterally disposed along sidewalls of the optical waveguide to serve as cladding so as to help confine the optical beam within the optical waveguide.

25. The system of claim 24 wherein the first and second buffers of insulating material are adapted to serve as electrical isolators to isolate first and second contacts from the optical path of the optical beams.

26. The system of claim 23 wherein the optical phase shifter further comprises a third contact coupled to the second region of the optical waveguide at a third location outside the optical path of the optical waveguide.

27. The system of claim 26 wherein the first buffer of insulating material is disposed between the third contact and the optical path of the optical beam.

28. The system of claim 22 wherein the phase shifter further comprises a charge modulated region to be modulated along the optical path of the optical beam and proximate to the insulating region between the first and second regions of the optical waveguide, the charge modulated region to modulate in response to a signal a phase of the optical beam to be directed through the optical waveguide.

29. The system of claim 22 wherein the optical phase shifter is included in an optical modulator to selectively modulate the optical beam.

30. The system of claim 22 wherein the optical phase shifter is included in an optical switch to selectively switch the optical beam.

* * * * *